UNITED STATES PATENT OFFICE.

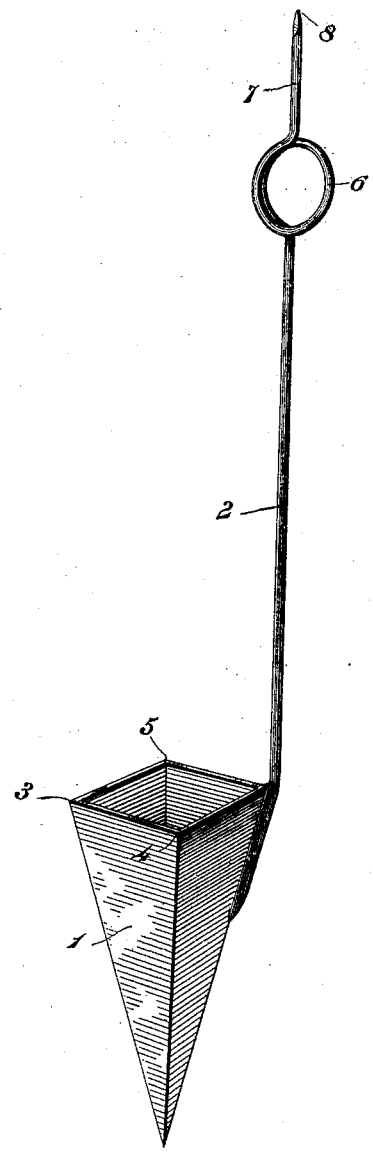

MARIA A. GILLILAND, OF BROOKLINE, MASSACHUSETTS.

SKIMMER.

976,733.

Specification of Letters Patent. Patented Nov. 22, 1910.

Application filed May 25, 1910. Serial No. 563,462.

*To all whom it may concern:*

Be it known that I, MARIA A. GILLILAND, a citizen of the United States, residing at Brookline, in the county of Norfolk and State of Massachusetts, have invented new and useful Improvements in Skimmers, of which the following is a specification.

This invention relates to skimmers intended to separate the cream from the top of milk in an ordinary milk jar, and the invention resides in the novel construction and arrangement of a skimmer and a handle therefor, which will hereinafter be more fully described and claimed.

Reference is to be had to the accompanying drawings forming a part of this specification, and in which drawings, the figure illustrates a perspective view of the device constructed in accordance with the present invention.

In the drawing the numeral 1 designates the bowl of the skimmer. This bowl 1 is of an inverted pyramidal formation and is provided with a handle 2 which is secured to one of the rounded edges of the bowl. It will be noted by this construction that the remaining edges of the bowl, designated by the numerals 2, 3, 4, and 5 serve as an effective means whereby the cream within the skimmer 1 may be readily directed to a vessel adapted for its reception. The pouring points 4 and 5 are arranged diametrically opposite each other and the pouring point 3 is arranged diametrically opposite the handle 2. The handle 2 is preferably constructed of a single strand of wire and is provided with a coil 6 from which extends an opening member 7. This member 7 has its extremity sharpened as at 8, to provide means whereby the cap of the bottle may be readily removed when it is desired to position the skimmer within the bottle to extract the cream from the milk. The coil 6 is adapted to serve as a means whereby the skimmer may be suspended from a suitable support as a nail or the like when the device is not in use.

From the above description, taken in connection with the accompanying drawing, it will be noted that I have provided an extremely simple and thoroughly effective device for the purpose intended, and while I have illustrated and described the preferred embodiment of the improvement, as it now appears to me, minor details of construction within the scope of the following claim may be resorted to if desired.

Having thus fully described the invention, what I claim as new is:—

A skimmer comprising an inverted pyramidal bowl, and a handle attached to one of the corners of the bowl.

In testimony whereof I affix my signature in presence of two witnesses.

MARIA A. GILLILAND.

Witnesses:
ROBT. J. LOGAN,
ALICE L. RICKER.